US011541369B1

(12) United States Patent
Mason

(10) Patent No.: US 11,541,369 B1
(45) Date of Patent: *Jan. 3, 2023

(54) ROTATING TISSUE DIGESTOR SYSTEM AND METHOD OF USE

(71) Applicant: Philip Jonathon Mason, Sandys (BM)

(72) Inventor: Philip Jonathon Mason, Sandys (BM)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,982

(22) Filed: Sep. 23, 2020

Related U.S. Application Data

(63) Continuation-in-part of application No. 16/567,216, filed on Sep. 11, 2019, now Pat. No. 10,835,773.

(60) Provisional application No. 62/798,142, filed on Jan. 29, 2019.

(51) Int. Cl.
*B01J 19/00* (2006.01)
*B09B 3/70* (2022.01)

(52) U.S. Cl.
CPC ......... *B01J 19/006* (2013.01); *B01J 19/0013* (2013.01); *B09B 3/70* (2022.01); *B01J 2219/00051* (2013.01); *B01J 2219/00765* (2013.01)

(58) Field of Classification Search
CPC .... B01J 19/00; B01J 19/0006; B01J 19/0013; B01J 19/0053; B01J 19/006; B01J 2219/00; B01J 2219/00049; B01J 2219/00051; B01J 2219/00761; B01J 2219/00763; B01J 2219/00765; B09B 3/00; B09B 3/70
See application file for complete search history.

(56) References Cited

U.S. PATENT DOCUMENTS

| | | | | |
|---|---|---|---|---|
| 4,735,750 A | * | 4/1988 | Damann | B01F 23/23 261/36.1 |
| 5,143,615 A | * | 9/1992 | Roy | G21F 9/06 210/350 |
| 5,254,472 A | * | 10/1993 | Brooks, III | C05F 17/957 422/209 |
| 5,534,162 A | * | 7/1996 | Adams | B01D 33/11 210/764 |
| 6,110,733 A | * | 8/2000 | Seymour | C05F 17/70 435/290.3 |
| 6,437,211 B2 | * | 8/2002 | Kaye | A61L 11/00 210/764 |
| 7,910,788 B2 | * | 3/2011 | Wilson | B09B 3/0075 588/318 |

(Continued)

*Primary Examiner* — Natasha E Young
(74) *Attorney, Agent, or Firm* — Sand, Sebolt & Wernow Co., LPA

(57) ABSTRACT

A tissue digester system includes a container for housing a digestion chamber having an exterior vessel for holding digestor fluid and an interior vessel, the container extending from a first end to a second end, the interior vessel having perforations and having baffles extending from an interior surface of the interior vessel; a lid secured to the exterior vessel and to provide access to the digestion chamber; one or more heating elements positioned to apply heat to the digestion chamber; a motor engaged with the interior vessel and to create rotational movement of the interior vessel; a control system, having a temperature controller; and a movement controller; the control system is to rotate the interior vessel and heat the digestion chamber based on user commands; and the digestion chamber is to break down remains through application of the digestor fluid to the tissue remains.

35 Claims, 15 Drawing Sheets

(56) References Cited

U.S. PATENT DOCUMENTS

| | | | |
|---|---|---|---|
| 8,235,319 B2 * | 8/2012 | Sullivan | B09B 3/0075 |
| | | | 241/301 |
| 9,018,433 B2 * | 4/2015 | Wilson | B01J 19/24 |
| | | | 588/314 |
| 9,492,697 B2 * | 11/2016 | Wilson | B01J 19/28 |
| 9,914,944 B2 * | 3/2018 | Nørholm | C12M 45/06 |
| 10,835,773 B2 * | 11/2020 | Mason | B09B 5/00 |

\* cited by examiner

US 11,541,369 B1

ROTATING TISSUE DIGESTOR SYSTEM AND METHOD OF USE

CROSS REFERENCE TO RELATED APPLICATIONS

This application is a continuation of U.S. patent application Ser. No. 16/567,216, now U.S. Pat. No. 10,835,773, filed Sep. 11, 2019, which is a nonprovisional parent application of, and claims the benefit to, U.S. Provisional Patent Application No. 62/798,142, filed Jan. 29, 2019, and claims priority to Canadian Patent Application Serial No. CA3050588, filed on Jul. 25, 2019, the disclosures of which are hereby incorporated herein in their entirety.

BACKGROUND

1. Field of the Invention

The present invention relates generally to the disposal of remains, including animal remains and human remains, and more specifically to a tissue digester system that provides for an energy efficient means to digest tissue.

2. Description of Related Art

The disposal of remains is a common practice for both animals and humans. Veterinary offices, animal shelters, small farms and individual pet owners frequently require disposal of animal carcasses. Further, when a loved one or family member passes, this too requires disposal of the body. In FIG. 1, a flowchart 101 depicts conventional methods associated with remains disposal. For example, one common method is through the burial of the remains, as shown with box 103. The second most common method is through flame incineration of the remains, as shown with box 105. Flame incineration produces large amounts of carbon dioxide and requires extensive energy consumption, as shown with boxes 107, 109. Further, in some locations land burial is prohibited by law or impractical within the confines of a city. Accordingly, it is desirable and an object of the present invention to provide a cremation solution that is simple, cost effective, and efficient system to speed up the digestive process during alkaline hydrolysis of animal tissue that does not suffer from the problems or deficiencies associated with prior solutions.

In recent years alkaline hydrolysis tissue digestors have been increasingly used as a more environmentally acceptable alternative to land burial or incineration for the orderly and safe disposition of deceased animals. With alkaline hydrolysis, the process includes exposing soft tissue to a strong, heated alkaline solution for predetermined periods of time depending on the process temperatures and pressures. At the end of the process, the fully dissolved fluidized tissue is then considered safe to discharge into the environment either through the sewerage system or dispersed as liquid fertilizer. The sterile bones and teeth typically remain at the end of the process and can be crushed into a powder that may be used as a soil additive or presented to the pet owner in a memorial urn in much the same way as ash from a crematory.

It would be desirable to have a method of performing alkaline hydrolysis tissue digestion that can process multiple carcasses, individually separated within a non-pressurized system that is simple, safe and economical to operate.

3. Brief Summary

The present invention relates generally to a machine that is a container with an exterior vessel and an interior vessel, the vessels creating a digestion chamber to receive remains therein for digestion. The container is configured to receive a liquid, such as an alkaline digestive fluid, receive heat, and rotate, thereby creating an environment wherein the soft tissue will be safely dissolved and separated from solid bone material. At the end of the process the sterile dissolved tissue fluid can be safely discharged into the environment leaving only the mineral ash of the bones and teeth behind for further processing into powdered remains.

Advantages of the present invention will become obvious to the reader and it is intended that these advantages are within the scope of the present invention.

This invention may be embodied in the form illustrated in the accompanying drawings, attention being called to the fact, however, that the drawings are illustrative only, and that changes may be made in the specific construction illustrated and described within the scope of this application.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
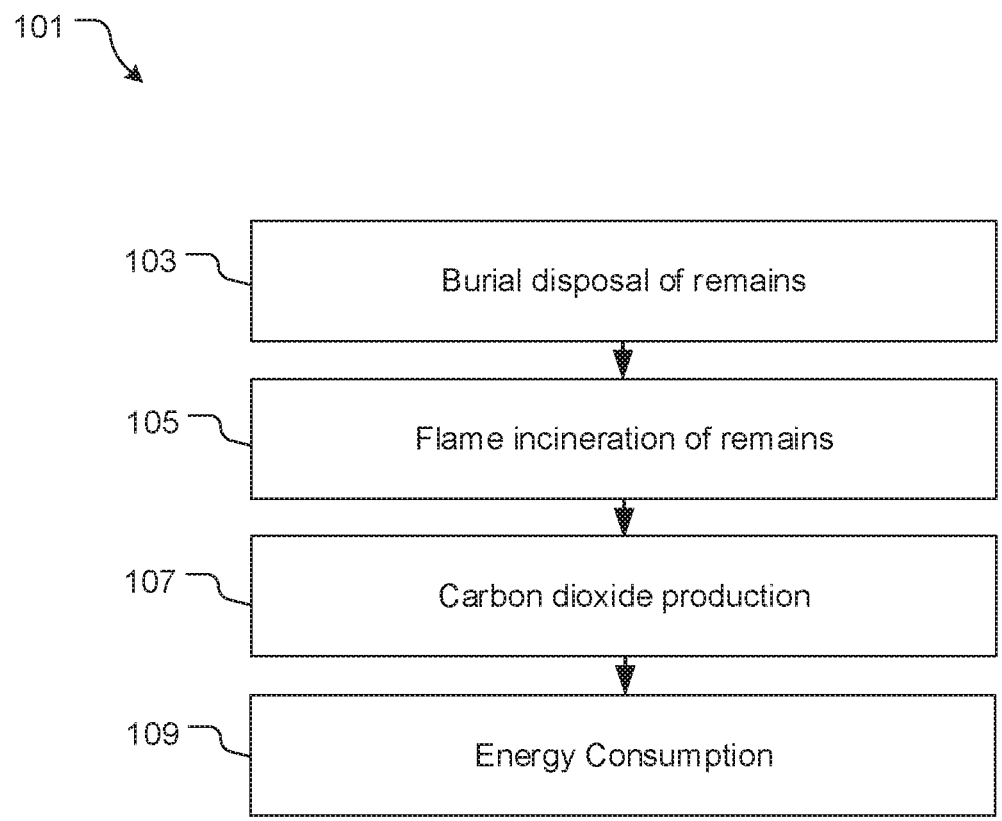
FIG. 1 is a flowchart of the method associated with conventional tissue disposal.
Figure 2:
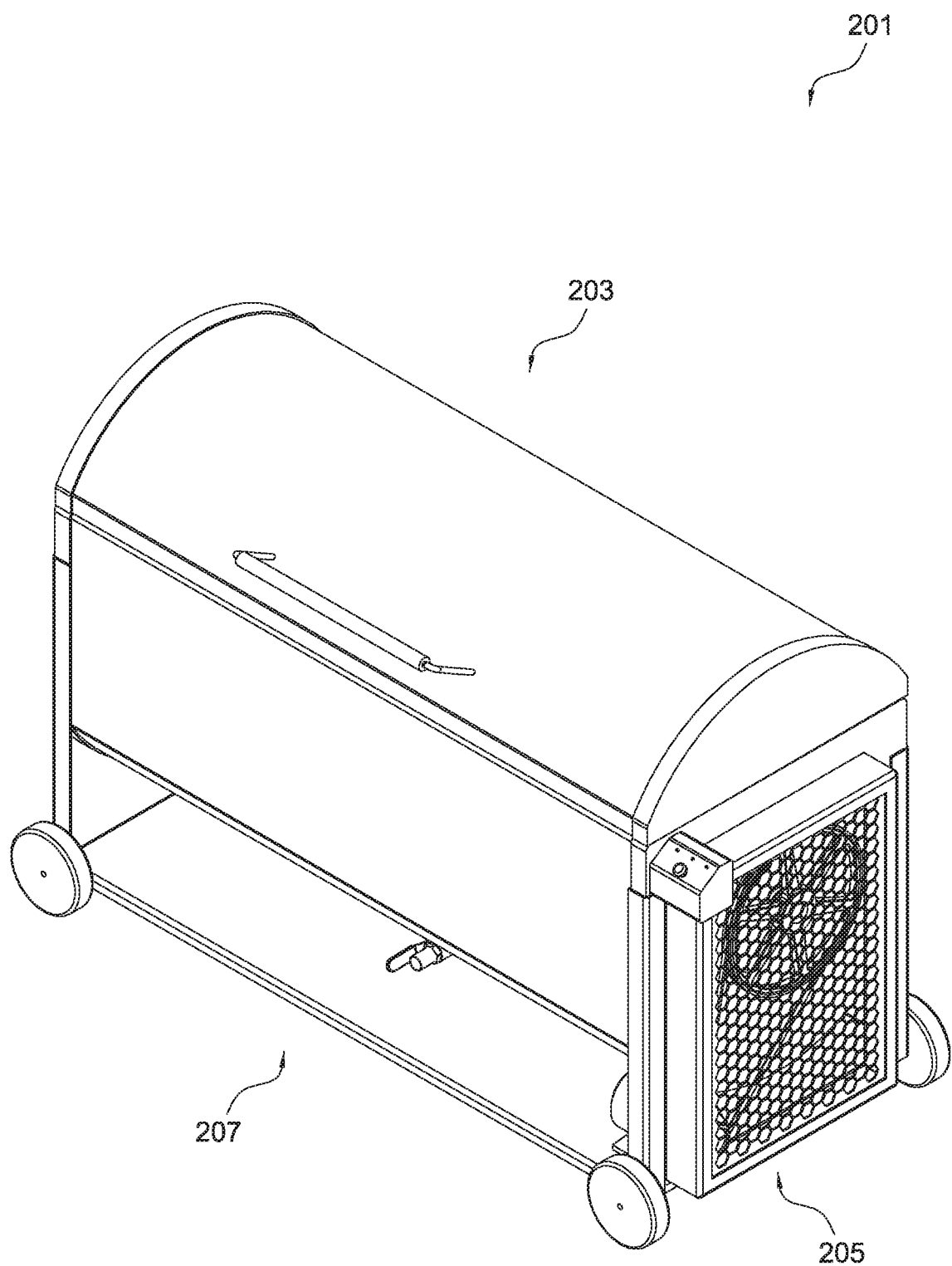
FIG. 2 is a front isometric view of a tissue digester system in accordance with a preferred embodiment of the present application.
Figure 3:
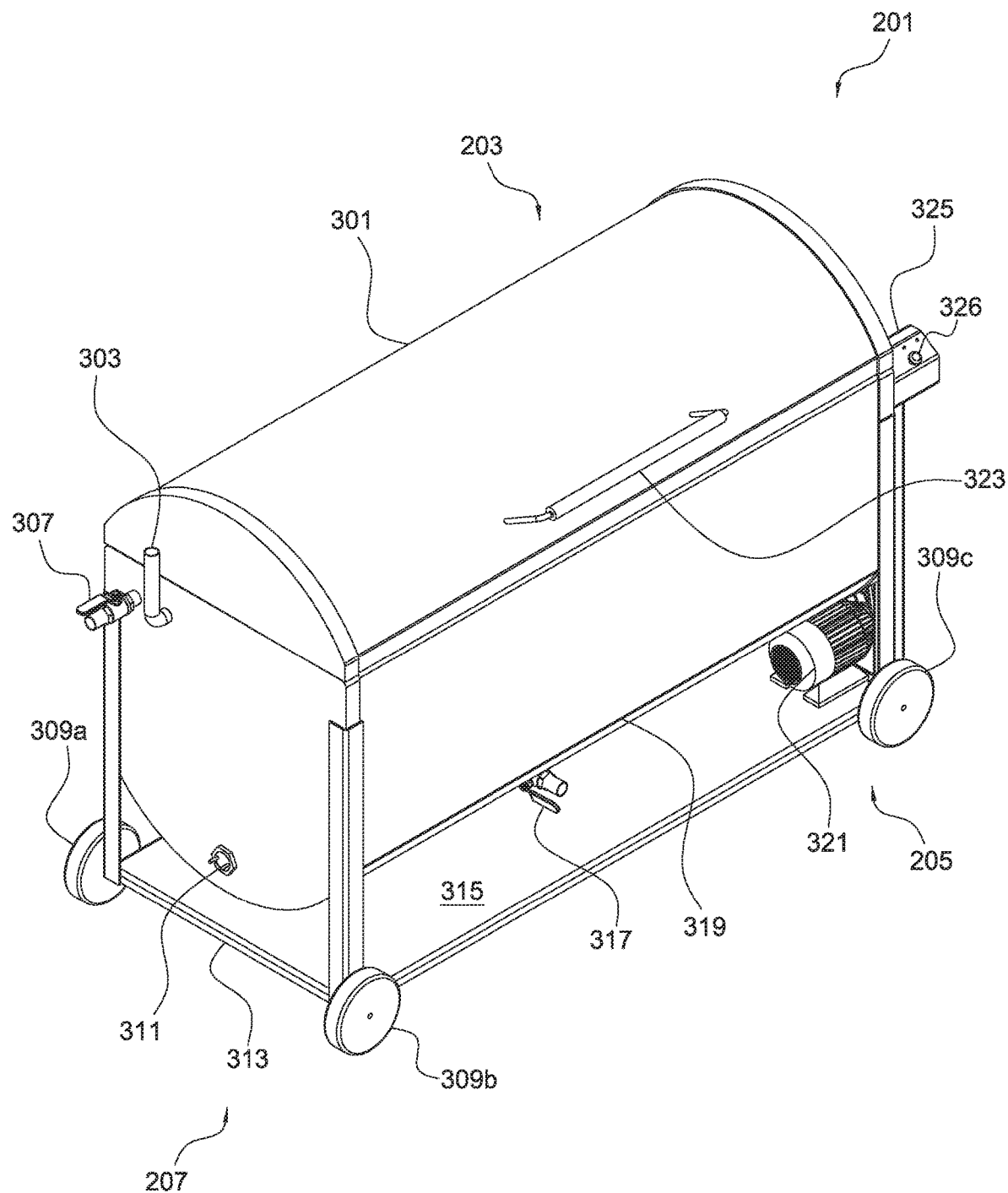
FIG. 3 is a left side front isometric view of the tissue digester system of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-7 depict various views of a tissue digestion system 201 in accordance with a preferred embodiment of the present application.

Figure 4:
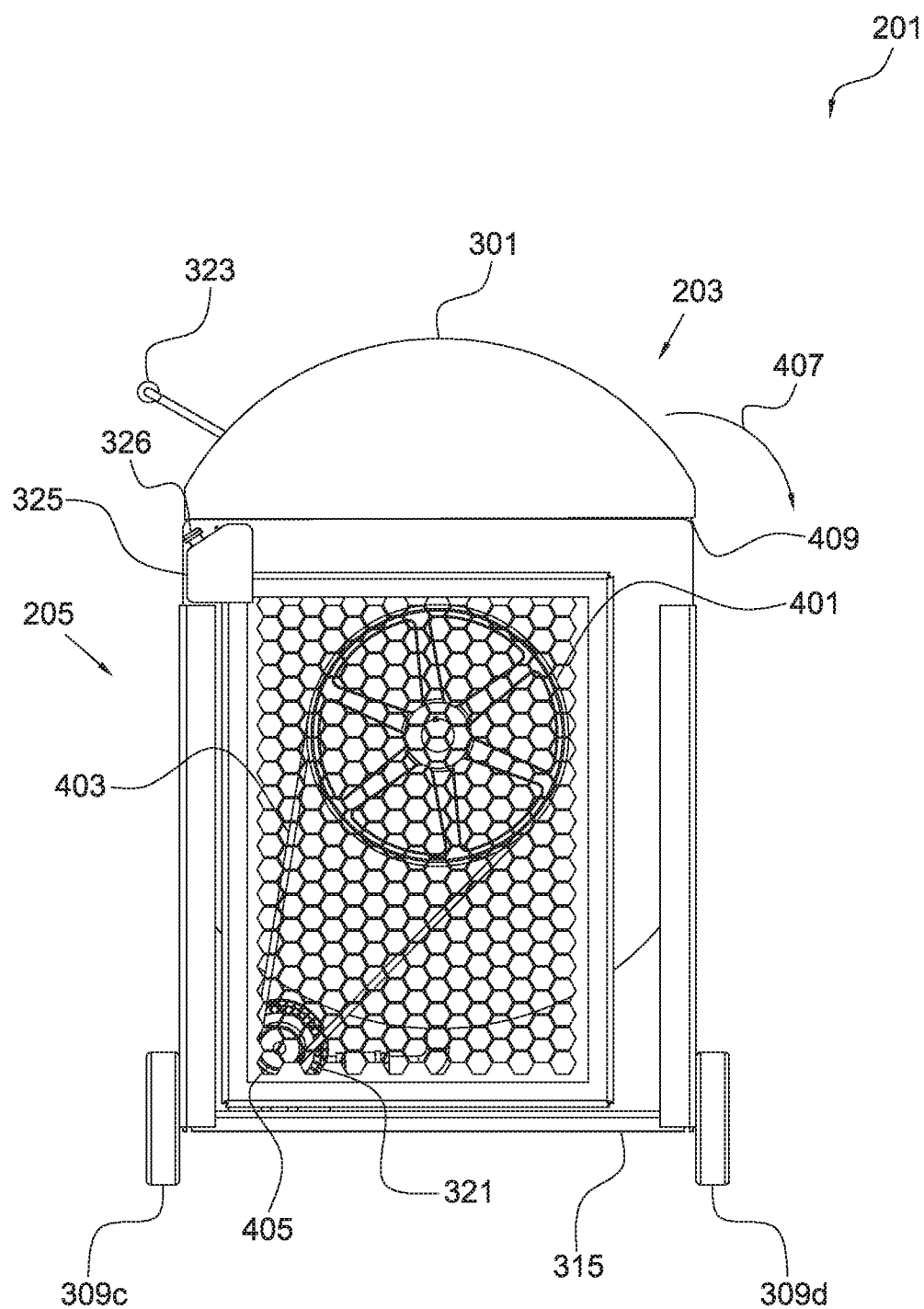
FIG. 4 is an end view of the tissue digester system of FIG. 2.

System 201 includes a container 203 for housing a digestion chamber, the container 203 being supported by a support system 207 and having a control system 205 for controlling various aspects of the digestion process. As shown, the container 203 includes a lid 301 with one or more handles 323 and attached to an exterior vessel 319, wherein the lid 301 is configured to provide access to the digestion chamber. As shown in FIG. 4, the lid 301 is configured to open and close 407 against the container, thereby providing a user with access to the digestion chamber. It should be appreciated that although the lid is shown on the top of the exterior vessel, it is contemplated that the lid could vary in location, size, style, and the like.

Figure 5:
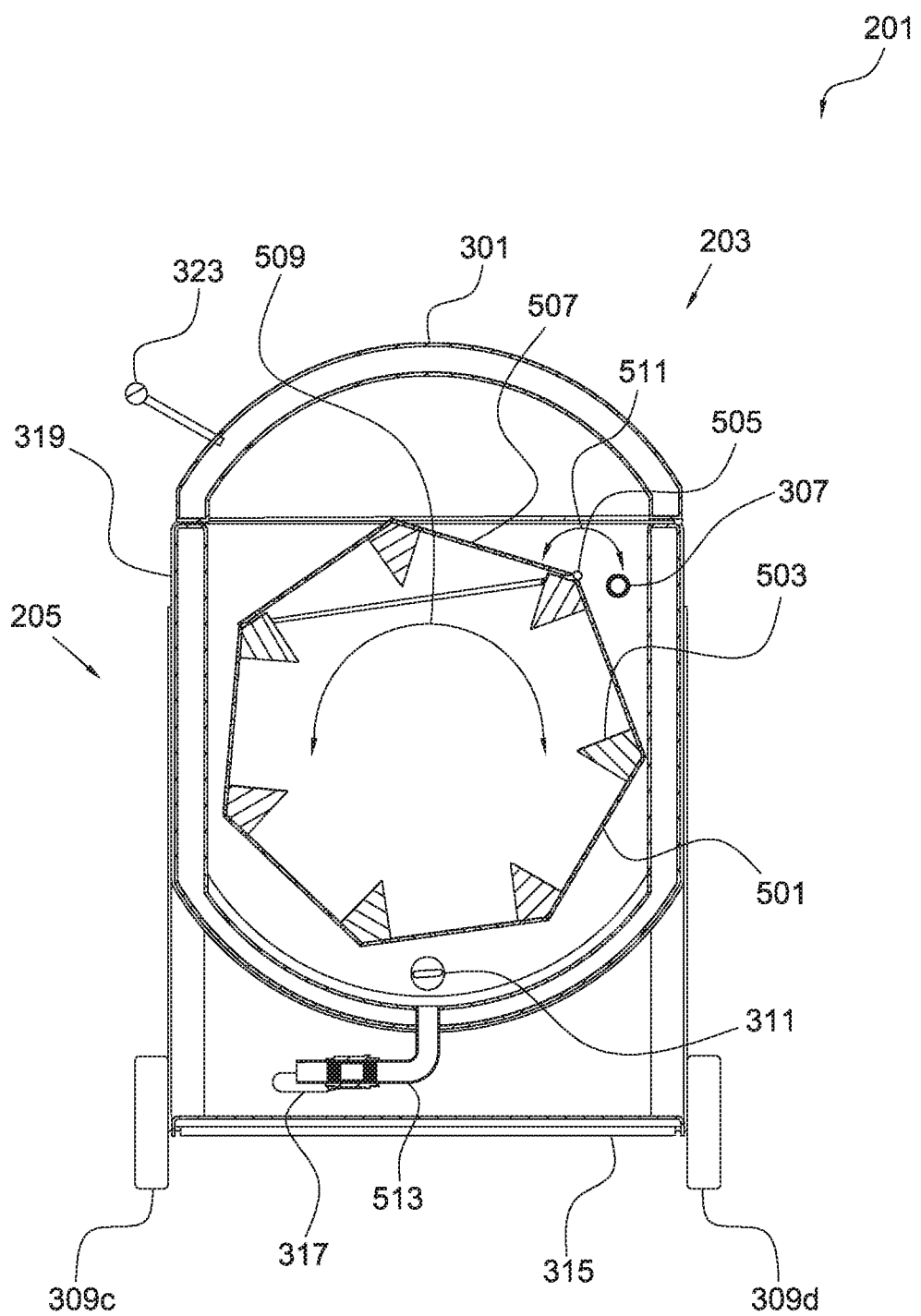
FIG. 5 is an end cross sectional view of the tissue digester system of FIG. 2.

The exterior vessel 319 is supported above a ground surface by the support system 207, which can include a base 313 with a top surface 315, as well as one or more wheels 309a-c, thereby allowing for portability of the system. It should be appreciated that the support system 207 may vary based on aesthetical, functional, or manufacturing considerations. As best shown in FIG. 5, the exterior vessel 319 can be double walled, wherein an insulation is placed between the walls. It should be appreciated that the insulation can be a spray foam or the like.

System 201 further includes a motor 321 in communication with the control system 205, the motor 321 configured to provide rotational movement of an interior vessel 501. It should be appreciated that various means of rotation are contemplated. As shown in FIG. 4, one means of rotation can include one or more gears 405, engaged with one or more flywheels 401, via one or more belts 403. As discussed, the control system 205 is configured to operate rotation, such as through one or more panels 325 and controls 326 as will be discussed in more detail herein. System 201 further including a heating element 311, such as an electronic heating element.

System 201 further includes fluid flow controls, including a fluid inlet 307 and a drain 317. As shown in FIG. 5, a drain tube 513 connects the inside of the digestion chamber with the valve 317. System 201 further including a gas exhaust vent pipe 303. It should be appreciated that the valves can be electronic valves in communication with the control system.

Figure 6:
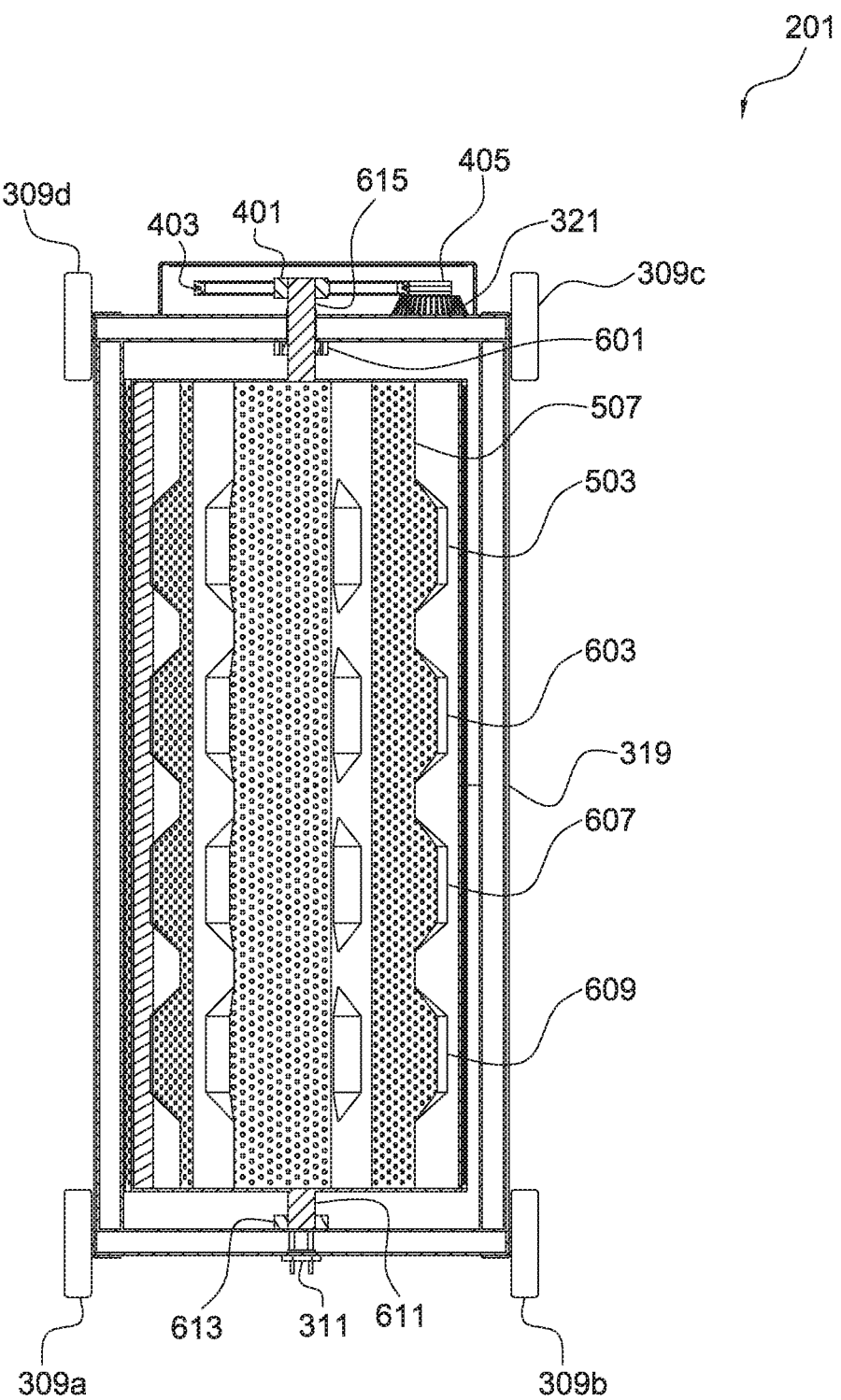
FIG. 6 is a top open view of the tissue digester system of FIG. 2.

Referring now to FIG. 6, as shown, the container 203 houses an interior vessel 501, the interior vessel extending from a first end to a second end and having a plurality of baffles 503 that extend into an interior area, thereby providing for an object to aid in breaking up and dissolving the soft tissue remains. It should be appreciated that the baffles 503 can extend the entire length of the interior vessel or a partial length. In addition, it should be appreciated that the plurality of baffles can vary in shape and size based on aesthetical, functional, and manufacturing considerations.

In some embodiments, the arrangement of the baffles 503 can include a plurality of individual rod-shaped projections coupled to the interior surface of the interior vessel 501. It should be appreciated that the individual rod-shaped projections can lift and manipulate the tissue remains as the interior vessel 501 rotates. Further, in some embodiments, the arrangement of the baffles 503 can include a plurality of angled projections configured to lift and manipulate the tissue remains as the interior vessel rotates. It should be appreciated that the angled projections can couple to the interior surface of the interior vessel 501 or to a central rotating axel.

As further shown, the interior vessel 501 includes a lid 507 pivotally attached 511 via one or more hinges 505, thereby providing access to the inside of the interior vessel. The interior vessel 501 is engaged with the motor, wherein the motor provides rotational movement 509 of the interior vessel.

In FIG. 6, a top view of an open container is shown for clarity. As shown, the interior vessel 501 can be composed of a perforated steel, thereby allowing for fluid flow around and into the interior vessel 501. Further, this illustration depicts the plurality of baffles 503, 603, 607, 609 extending the length of the interior vessel. It should be appreciated that the exterior vessel is configured to receive the digestion fluid, such as a strong alkaline (base) digestive fluid.

As further shown, the interior vessel 501 is supported by a support system, the support system including one or more shafts 611, 615 and one or more gears 601, 613 that allow for engagement with the motor, such that the motor can provide rotational movement thereto.

Figure 7:
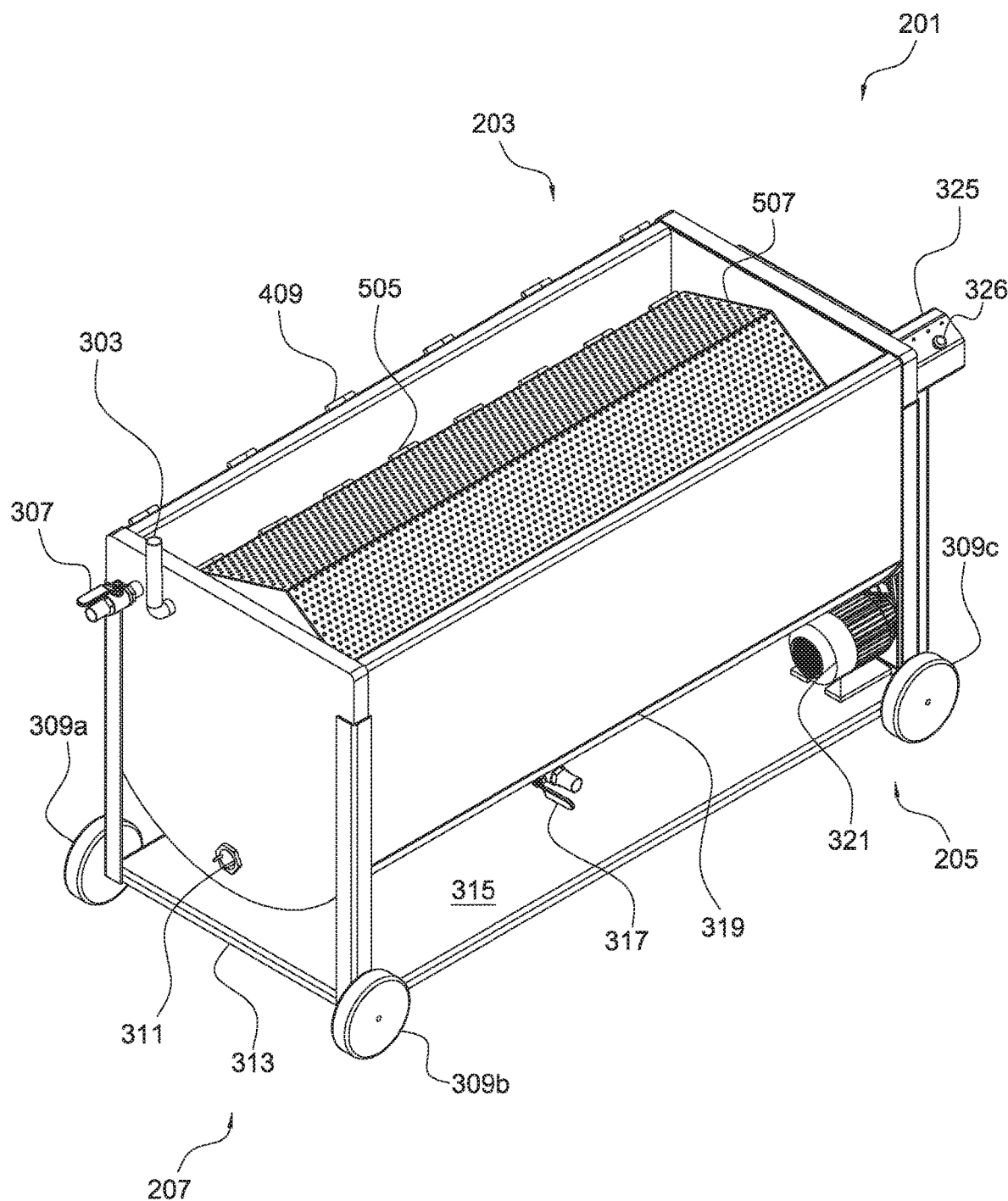
FIG. 7 is an isometric open view of the tissue digester system of FIG. 2.

In FIG. 7, an open view further depicts system 201 for clarity.

Figure 8:
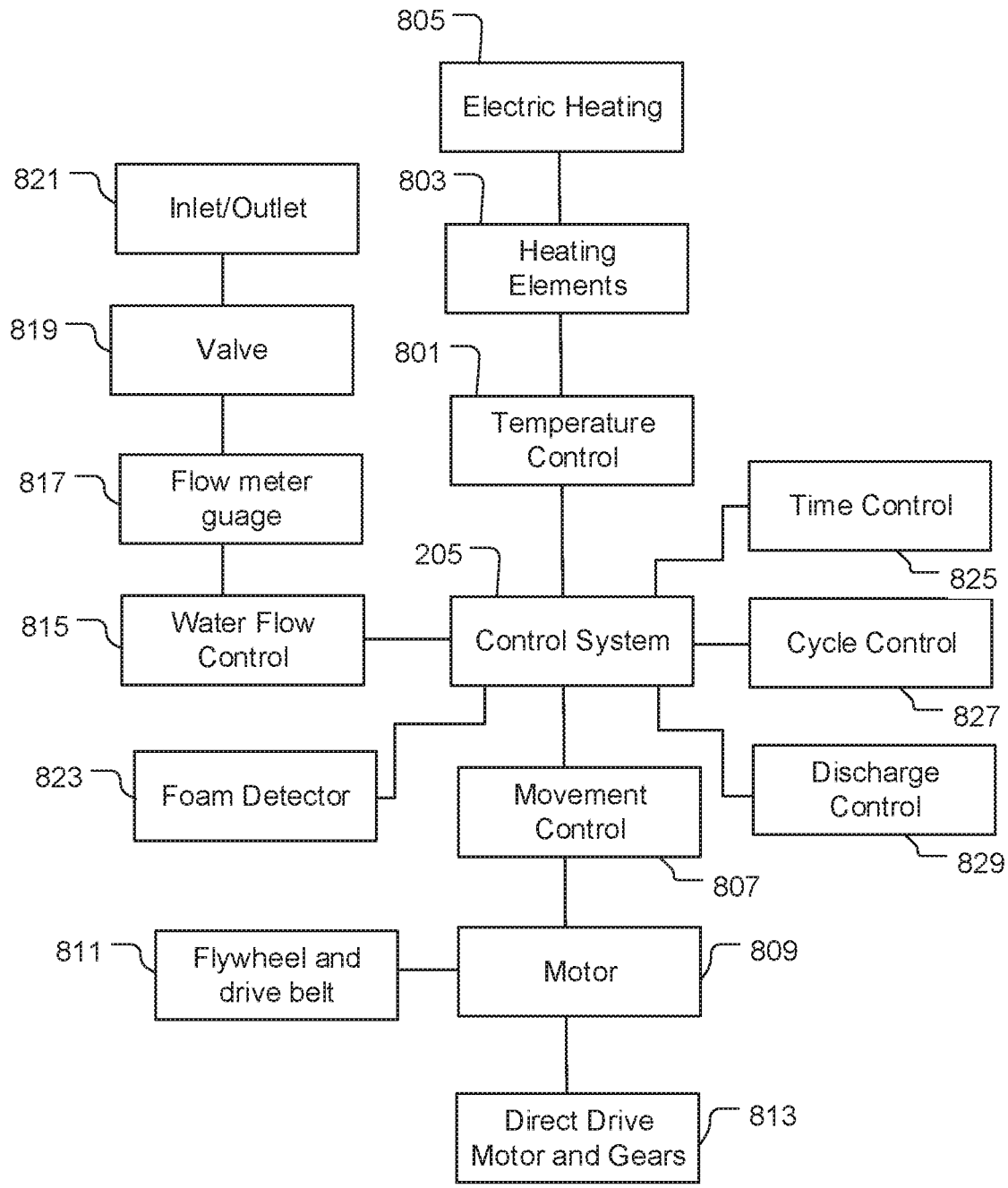
FIG. 8 is a schematic of a control system of the tissue digester system of FIG. 2.

In FIG. 8, a simplified schematic depicts the features associated with the control system 205. The control system 205 being configured to operate a temperature control 801 associated with the digestion chamber. The temperature control 801 can be achieved via various features, such as one or more heating elements 311, 803, such as electric heating elements 311, 805. In some embodiments, it is contemplated that the electric heating elements 805 are placed directly in the digestion chamber.

The control system 205 is further configured to operate movement control 807 by being in communication with the motor 809. It should be appreciated that the motor 809 may engage with various elements to rotate the interior vessel as is known in the art. For example, the motor 809 may engage with a flywheel and drive belt via one or more gears 811 or may engage with a direct drive motor and gears 813. It is contemplated and should be appreciated that alternative embodiments could be adapted for rotation of the interior vessel.

In some embodiments, the control system 205 can be in electrical communication with water control features 815, including one or more flow meter gauges 817, in further communication with one or more valves 819, and in further communication with fluid inlets/outlets 821. This allows for a user to operate the fluid content of the digestion chamber.

In some embodiments, the control system 205 further includes a foam detector 823, the foam detector configured to determine if a foam level is too high, thereby activating necessary actions, such as shutting off the digestion cycle.

Lastly, it is contemplated that the control system 205 can operate a time control 825, a cycle control 827, and a discharge control 829. These additional controls allow for the user to set a particular cycle, such as digestion cycle, a rinse cycle, and a cleaning cycle, and further set such cycles for a particular time. The discharge control configured to control discharge of the contents of the digestion chamber.

Figure 9:
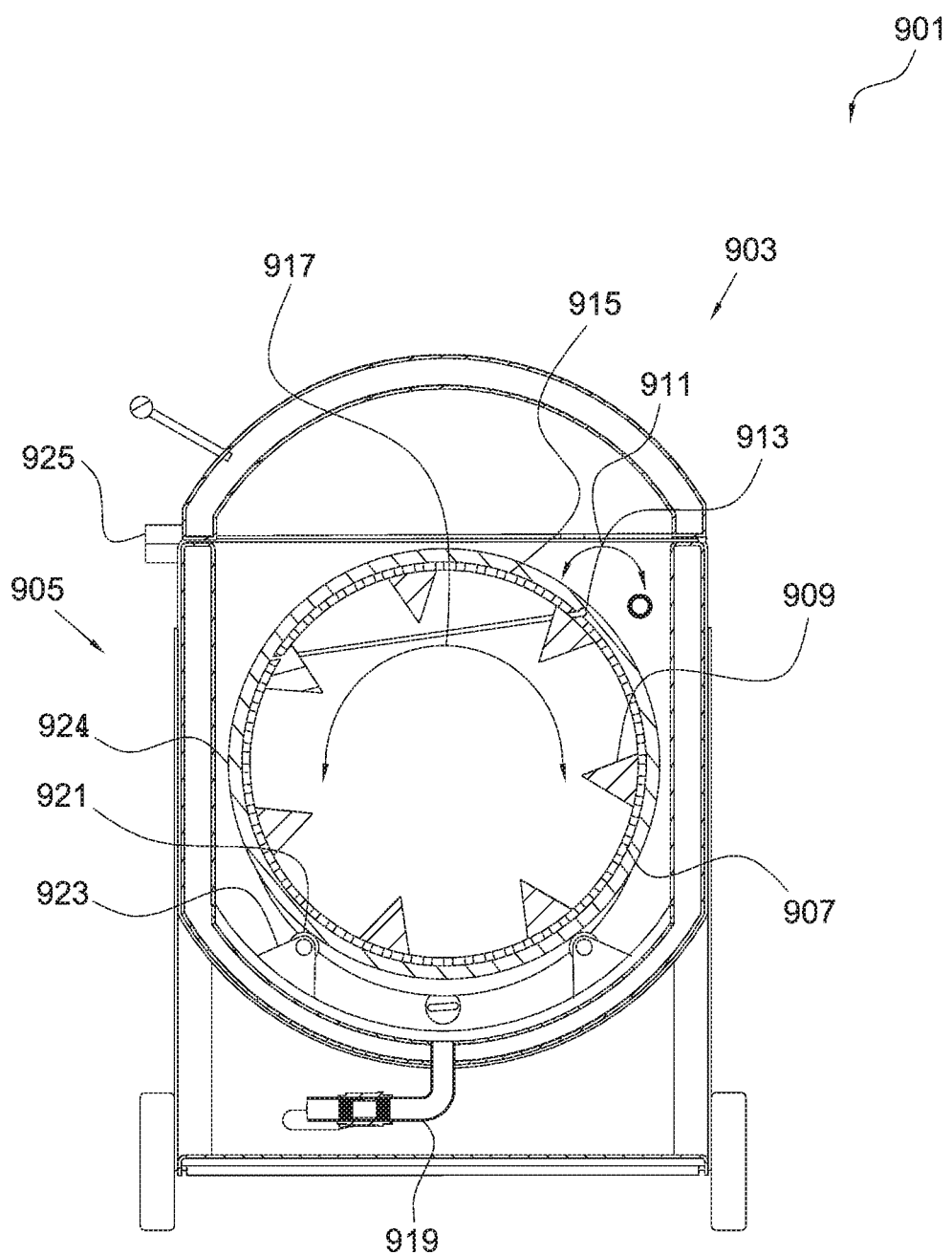
FIG. 9 is an end view of an alternative embodiment of an interior vessel within an exterior vessel having an insulation layer associated with a tissue digester in accordance with the present application.

In FIG. 9, an end view of an alternative embodiment 901 is shown. It should be appreciated that the features of the embodiments can be interchanged. In this embodiment, container 903 includes an exterior vessel 905 and an interior vessel 907, wherein the container 903 is positioned at an angle not parallel to a ground surface, but rather at an angle between 1 and 90 degrees. The interior vessel including baffles 909 as previously discussed, a lid 915 secured via hinges 913 and configured to open 911 to provide access therein. During use, the interior vessel is configured to rotate 917 as discussed above. As further shown, this embodiment demonstrates that the interior vessel can be cylindrical in shape, as opposed to polygonal, as shown in the previous embodiment. The lid can be positioned so as to bisect the interior vessel in two equal halves and may be mechanically fixed to allow removal of top half. This embodiment further includes one or more rotational bearings 921 held in place via a support system 923 and engaged with tracks 924 to provide for support during rotation of the interior vessel. The system further including a lock 925 for locking the door in a closed position.

Figure 10:
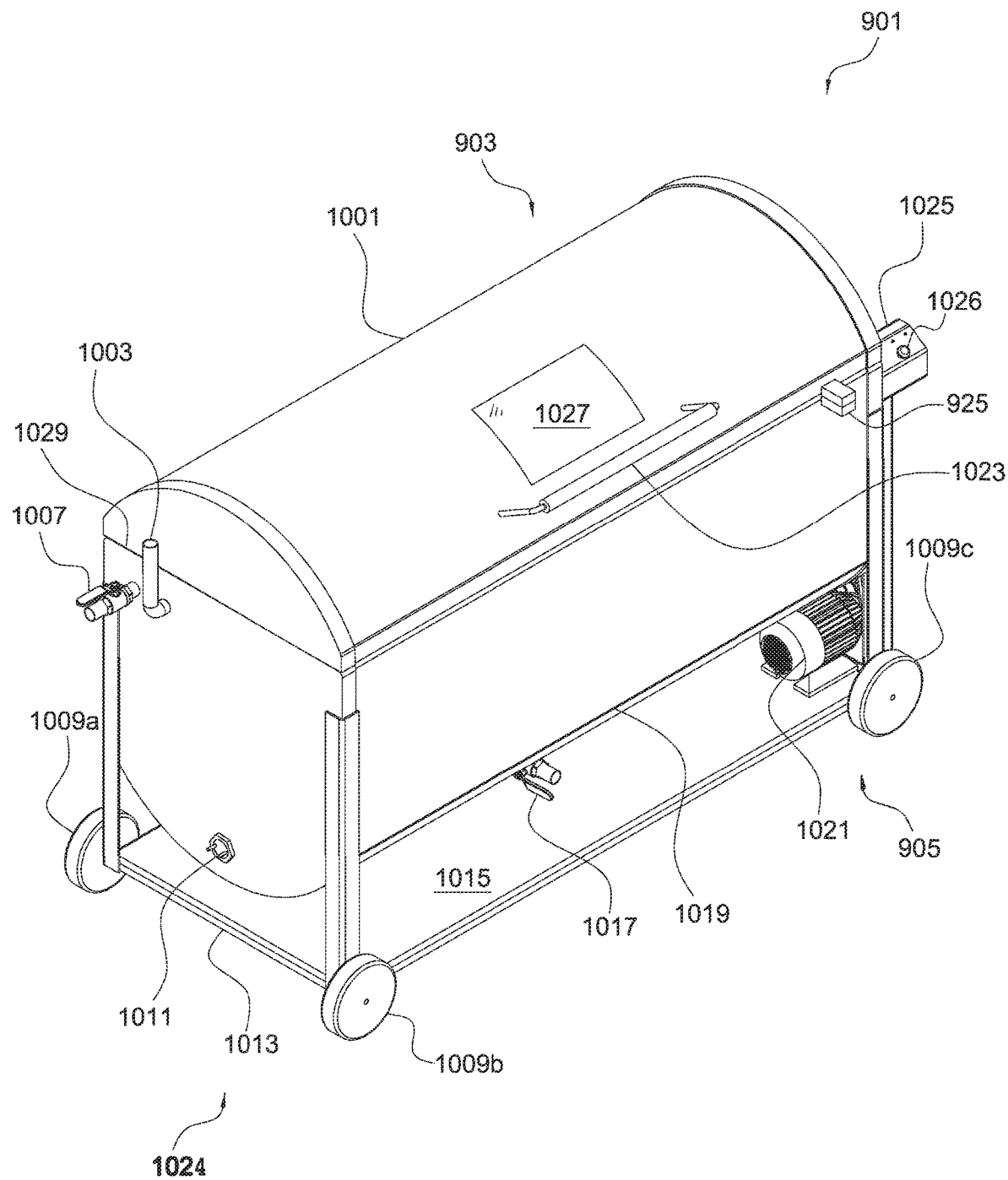
FIG. 10 is an isometric view of an alternative embodiment of a tissue digester system in accordance with the present invention.

In FIG. 10, yet another embodiment is shown, wherein a transparent viewing port 1027 is included for providing visibility into the chamber and a gasket 1029 provides for an improved seal. As shown, system 901 further includes the exterior vessel 1019, a lid 1001 with a handle 1023, and a support system 1024. The support system 1024 having wheels 1009, a platform 1015, and the like. In addition, system 901 includes the features previously discussed, including a vent pipe 1003, a fluid inlet 1007, a fluid outlet 1017, a heating element 1011, a control panel 1025 with buttons 1026, and a motor 1021.

Figure 11:
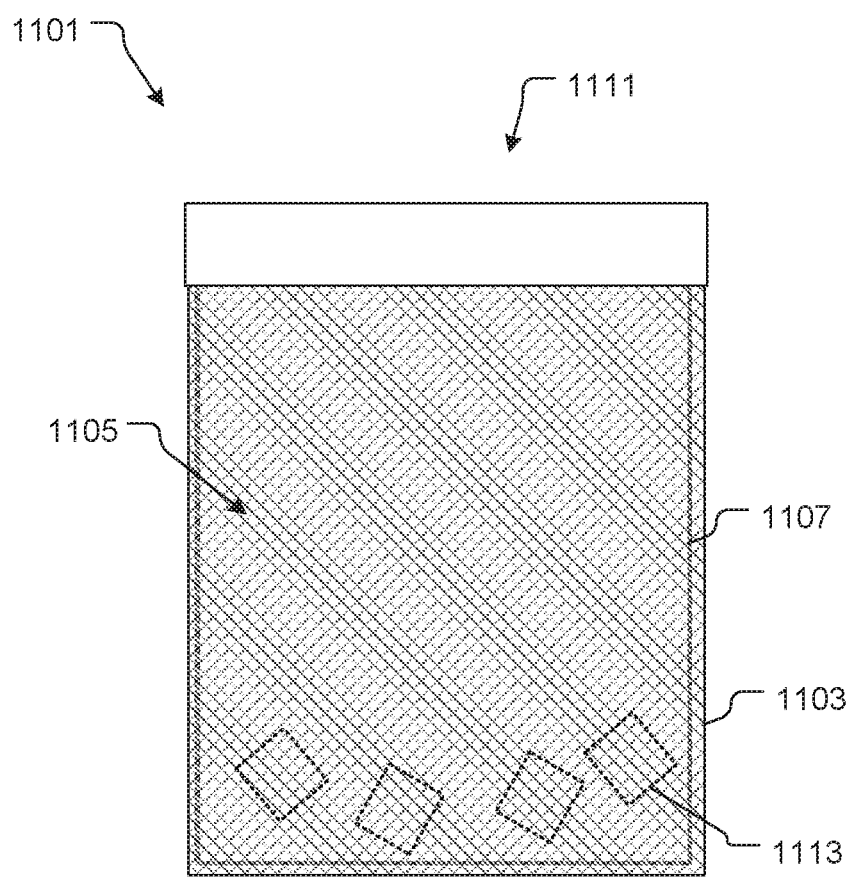
FIG. 11 is a front view of an alkaline hydrolysis bag configured to receive remains in accordance with the present invention.

In FIG. 11, a front view of one example of an alkaline hydrolysis (AH) bag 1101 configured to receive remains, is shown. The bag 1101 is configured to receive remains before being placed within the interior vessel for tissue digestion. In one embodiment, the AH bag has an exterior body 1103 composed of interlinked metal wires 1105 forming apertures. In some embodiments, an inner bag 1107 composed of a non-digestible copolymer bag is configured to be secured within the AH bag to receive the remains therein via an opening 1111. In yet other embodiments, one or more tumbling blocks of steel 1113 are positioned within the inner bag or AH bag to aid in separation and exposure of the soft tissue of the remains.

Figure 12:
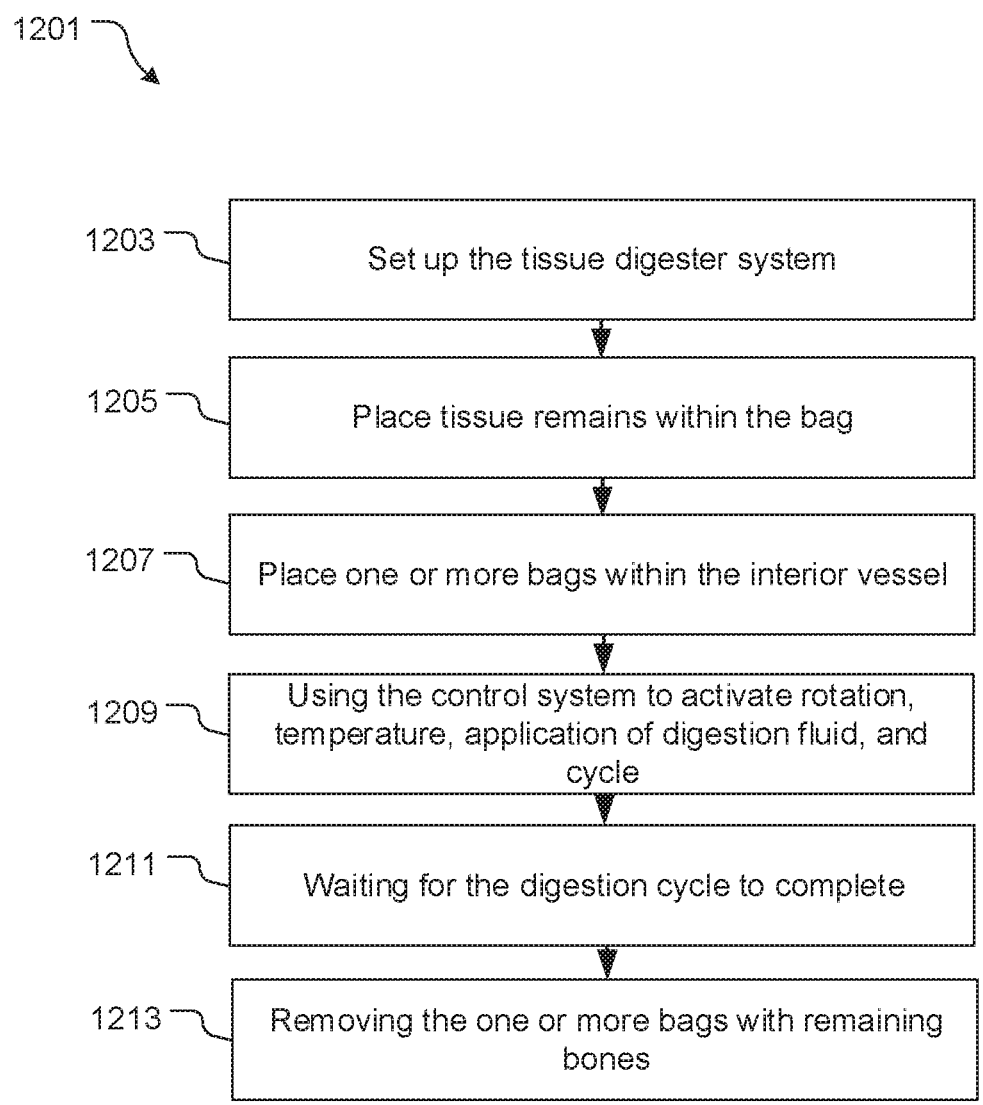
FIG. 12 is a flowchart of the method of use of the system of the present invention.

In FIG. 12, a flowchart 1201 depicts the general method of use of the system of the present invention. As shown, the tissue digester system is first set up as needed, the tissue digester system being configured to receive tissue remains within one or more AH bags, as shown with boxes 1203, 1205, 1207. The control system controls the temperature, application of digestion fluid, and the cycle, as shown with box 1209. Once the digestion cycle is completed, the digested soft tissue can be disposed of safely and the one or more bags with remaining bone can be ground up or otherwise processed, as shown with boxes 1211, 1213.

In the preferred embodiment, one or more dry chemicals such as potassium hydroxide or sodium hydroxide or a blend of both are added in sufficient measured quantity based on tissue weight. Water is added in a measured amount to the fully submersed tissue. The measured amount of a strong alkaline (base) digestive fluid is heated and maintained at a defined process temperature, typically 175 F-200 F for the duration of the process.

While rotating, the tissue bags tumble and impact the baffles attached to the interior vessel, wherein the baffles are configured to enhance agitation, abrasion and breakdown of tissue thereby reducing the process time.

In an embodiment, the motor speed and direction can be controlled and varied to achieve the most efficient and quickest processing time while maintaining the integrity of each tissue bag remains.

It should be appreciated that the system can be scaled up or down in length and diameter, as desired based on aesthetical, manufacturing, or functional considerations.

Among other things, it is an object of the present invention to provide a simple, cost effective, and efficient system to speed up the digestive process during alkaline hydrolysis of tissue that does not suffer from the problems or deficiencies associated with prior solutions.

Figure 13:
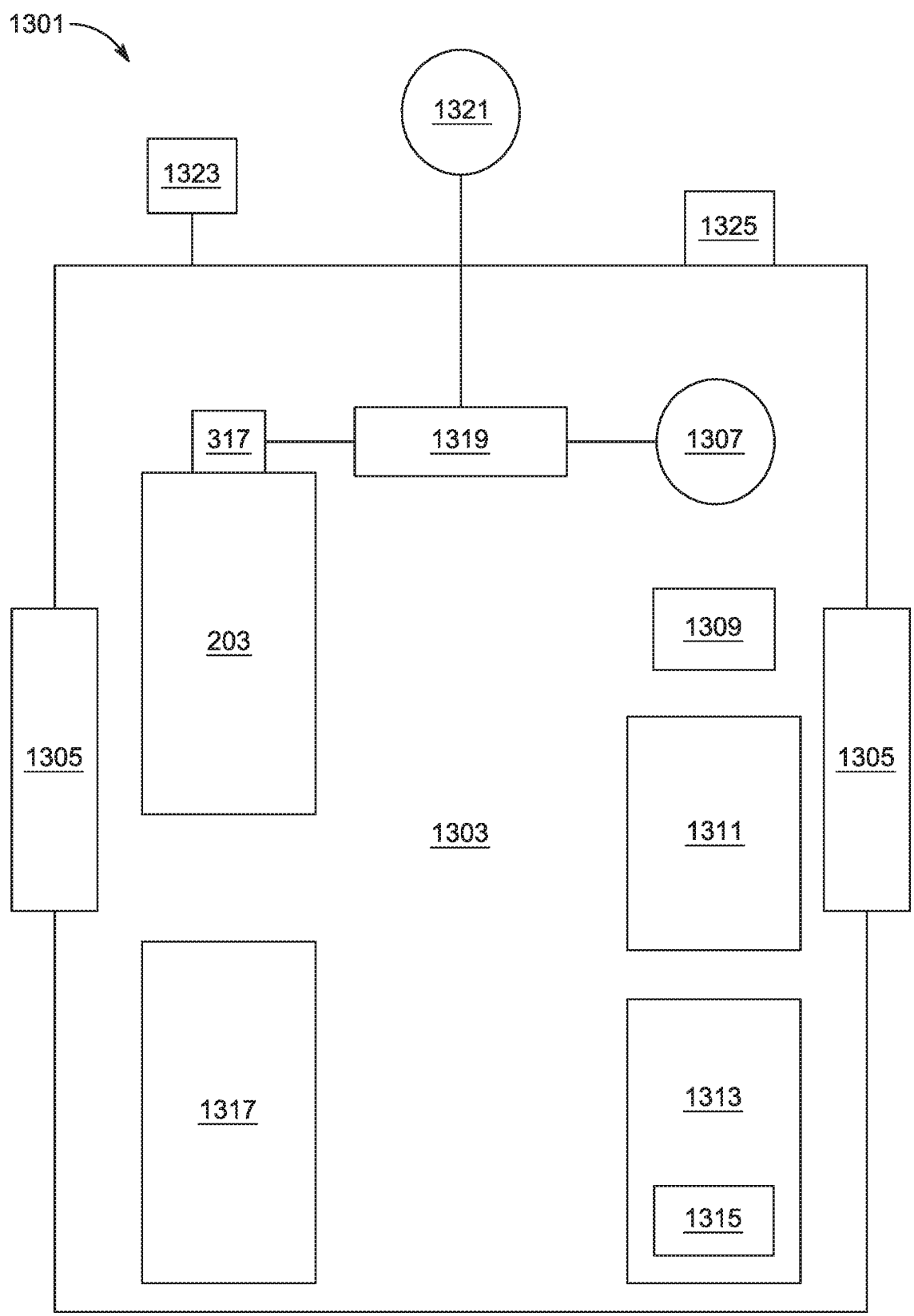
FIG. 13 is a schematic of an alternative embodiment of a tissue digester system in accordance with the present invention.

In FIG. 13, a simplified schematic of an alternative embodiment of a tissue digester system 1301 is shown. In this embodiment, the tissue digestion system 1301 includes the tissue digestion container 203 coupled to the cavity of a turnkey building 1303. The turnkey building 1303 is to be ready for occupation and use by a user for facilitating tissue digestion of remains. For example, the turnkey building 1303 is manufactured with hard plumbing and electrical infrastructure to allow the turnkey building 1303 to be transportable as one complete turnkey alkaline hydrolysis rotating tissue digestor plant. In addition, it should be appreciated that the turnkey building 1303 can be a shipping container or a portable trailer.

Further, the turnkey building 1303 includes the tissue digestion container 203 in communication with a heat exchanger system 1319 via valve 317. The heat exchanger system 1319 is in communication with a solar hot water tank 1307 and an effluent holding tank 1321. In addition, the turnkey building 1303 further includes one or more air vents 1305, a pump 1309, a drying rack 1311, a workstation 1313 having a bone processor 1315, a portable clean-in-place system 1317, a power source 1323 that stores and supplies electrical and/or solar energy, and an air conditioning unit 1325.

Figure 14:
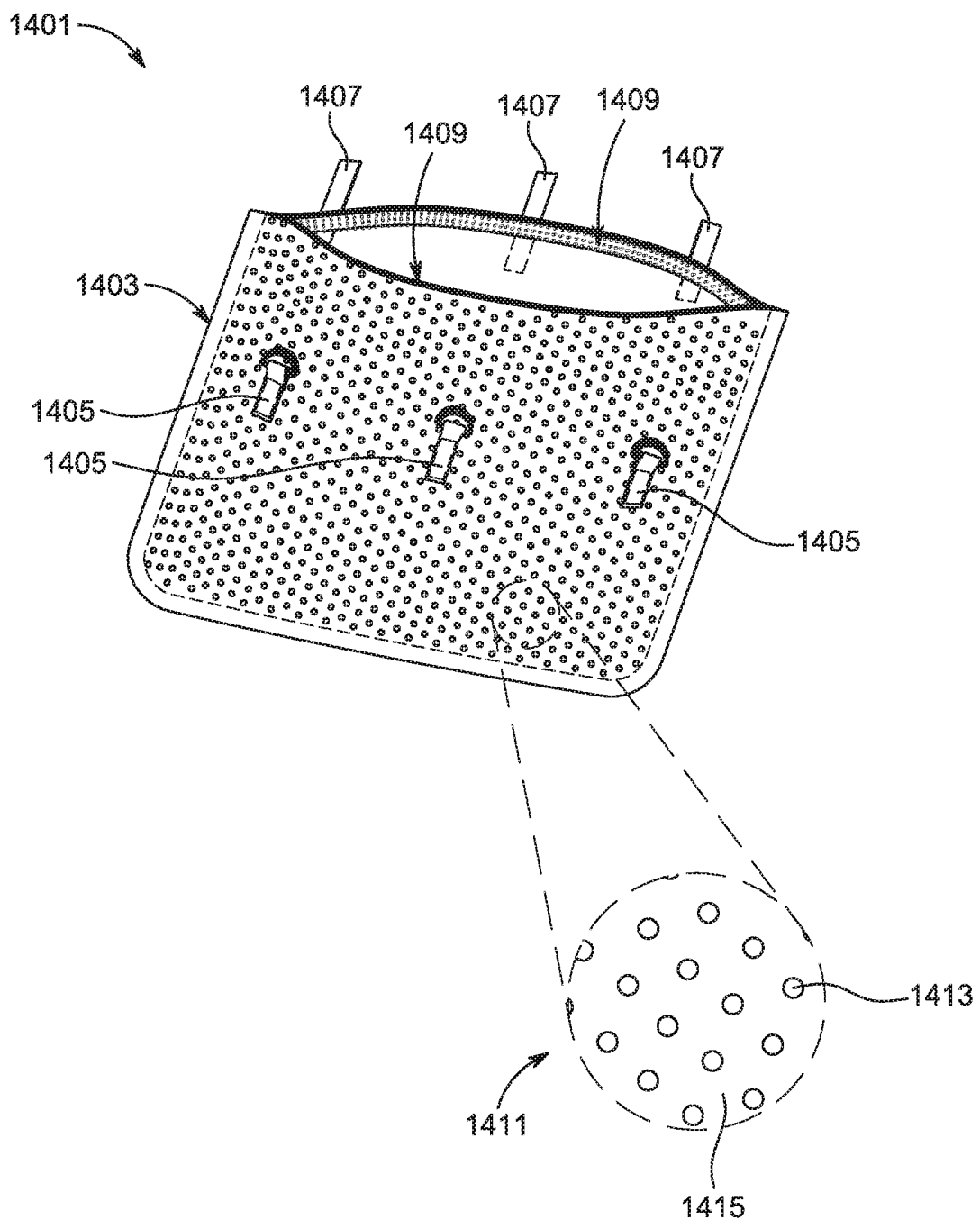
FIG. 14 is a perspective view of an embodiment of a reusable digestion container in accordance with the present invention.

In FIG. 14, a perspective view of an embodiment of a reusable digestion container 1401 is shown. The reusable digestion container 1401 is configured to receive remains before being placed within the interior vessel 501 for tissue digestion. In addition, the reusable digestion container 1401 includes a body 1403 comprising of a non-digestible protective material 1411 configured to prevent the digestion of the reusable digestion container 1401. It should be appreciated that the reusable digestion container 1401 comprises of non-digestible copolymer material 1411 that is flexible and resistant to digestion fluids.

Additionally, the non-digestible protective material 1411 includes a plurality of fluid apertures 1413 having a plurality of spaces 1415 measured, preferably, approximately 0.5 inches in between each fluid aperture. The plurality of fluid apertures 1413 is configured to allow the passage of digestion fluids therethrough. It should be appreciated that the diameter of the plurality of fluid apertures 1413 is measured, preferably, approximately 3/32 inches. Further, it should be appreciated that each fluid aperture is configured with either an elliptical shape with no vertices or a non-elliptical shape comprising no vertex small enough to capture biological material thereby.

The reusable digestion container 1401 further includes one or more resealable attachments, such as buckles 1405, straps 1407, dual lock fasteners 1409, or a combination thereof, configured to allow a user to open and close the reusable digestion container 1401. It should be appreciated that the resealable attachments can be molded, heat sealed, stitched, glued, or other suitable method to the body 1403. Likewise, it should be appreciated that the reusable digestion container 1401 itself can be molded as one piece or made with permanently sealed edges that can be molded, heat sealed, stitched, glued, or other suitable method of permanent closure along three edges.

Figure 15:
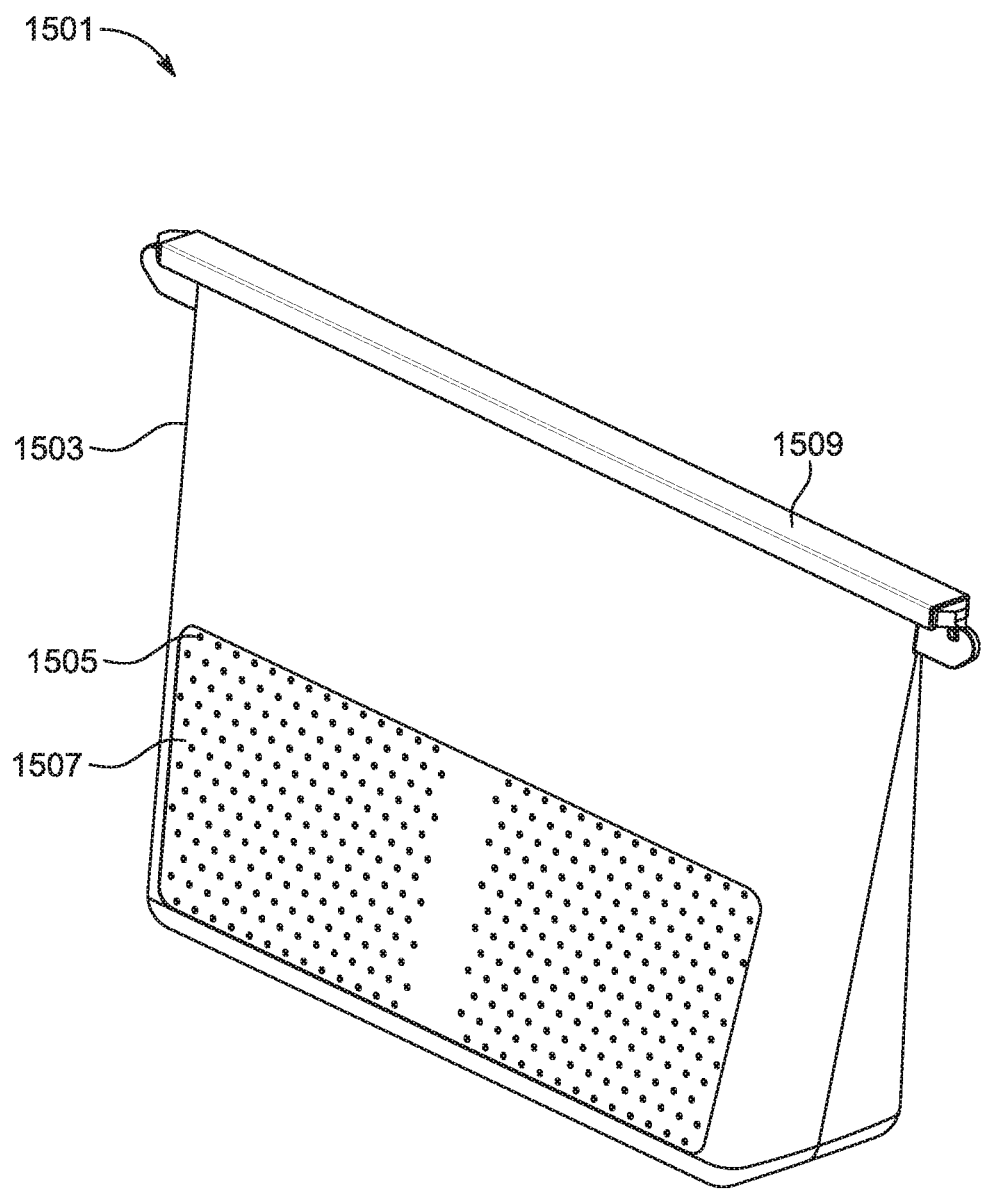
FIG. 15 is perspective view of another embodiment of a reusable digestion container in accordance with the present invention.

In FIG. 15, a perspective view of another embodiment of a reusable digestion container 1501 is shown. Just like the configuration of the reusable digestion container 1401 described above, the reusable digestion container 1501 is configured to receive remains before being placed within the interior vessel 501 for tissue digestion. It should be appreciated that the reusable digestion container 1501 comprises of non-digestible copolymer material that is flexible and resistant to digestion fluids. The reusable digestion container 1501 includes a body 1503 having a plurality of fluid apertures 1505 having a plurality of spaces 1507 measured, preferably, approximately 0.5 inches in between each fluid aperture. The plurality of fluid apertures 1505 is configured to allow the passage of digestion fluids therethrough. It should be appreciated that the diameter of the plurality of fluid apertures 1505 is measured, preferably, approximately 3/32 inches. Further, it should be appreciated that each fluid aperture is configured with either an elliptical shape with no vertices or a non-elliptical shape comprising no vertex small enough to capture biological material thereby.

The reusable digestion container 1501 further includes one or more resealable attachments, such as a top sliding collar bar 1509, configured to allow a user to open and close the reusable digestion container 1501. It should be appreciated that the resealable attachments can be molded, heat sealed, stitched, glued, or other suitable method to the body 1503. Likewise, it should be appreciated that the reusable digestion container 1501 itself can be molded as one piece or made with permanently sealed edges that can be molded, heat sealed, stitched, glued, or other suitable method of permanent closure along three edges.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A tissue digestor system, comprising:
   a container for housing a digestion chamber having an exterior vessel for holding digestor fluid and an interior vessel, the container extending from a first end to a second end, the interior vessel having a plurality of perforations and having a plurality of baffles;
   a lid secured to the exterior vessel and configured to provide access to the digestion chamber;
   one or more heating elements positioned to apply heat to the digestion chamber;
   a motor engaged with the tissue digestor system and configured to create rotational movement of the container;
   a control system, having:
      a temperature control in communication with the one or more heating elements and configured to control temperature application to the digestion chamber; and
      a movement control configured to control speed, direction, and amount of rotation;
   wherein the control system is operable to control temperature and movement based on predetermined process cycles;
   wherein the digestion chamber is configured to break down tissue remains through application of the digestor fluid to the tissue remains; and
   wherein at least some of the plurality of baffles are configured to manipulate the tissue remains during rotation.

2. The tissue digestor system of claim 1, wherein the plurality of baffles further comprises:
   a baffle arrangement, the baffle arrangement having:
      a plurality of individual rod-shaped projections configured to lift and manipulate the tissue remains as the interior vessel rotates, wherein the plurality of individual rod-shaped projections is coupled perpendicularly to an interior surface of the interior vessel; and
      a plurality of angled projections configured to lift and manipulate the tissue remains as the interior vessel rotates, wherein the plurality of angled projections is coupled to the interior surface of the interior vessel or to a central rotating axle.

3. The tissue digestor system of claim 1, further comprising:
one or more vibration elements positioned to apply vibration to the interior vessel or the plurality of baffles; and
one or more ultrasonic elements positioned to apply ultrasonic energy to the digestor fluid as the interior vessel rotates.

4. The tissue digestor system of claim 1, wherein the exterior vessel further comprises:
a rotational system, wherein the rotational system includes a pivot point that allows the exterior vessel with the interior vessel to tilt back and forth.

5. The tissue digestor system of claim 1, further comprising:
one or more reusable digestion containers configured to receive biological material, the one or more reusable digestion containers comprising a non-digestible copolymer material configured to prevent digestion of the one or more reusable digestion containers, wherein the non-digestible copolymer material is flexible and resistant to the digestor fluid.

6. The tissue digestor system of claim 5, wherein the one or more reusable digestion containers comprise resealable attachments configured to facilitate easy opening and closing of the one or more reusable digestion containers.

7. The tissue digestor system of claim 5, wherein the one or more reusable digestion containers comprise a plurality of fluid apertures configured to permit passage of the digestor fluid therethrough, wherein each fluid aperture of the plurality of fluid apertures is configured with either an elliptical shape with no vertices or a non-elliptical shape comprising no vertex small enough to capture biological material thereby.

8. The tissue digestor system of claim 1, wherein at least some of the plurality of baffles comprise rod-shaped projections.

9. The tissue digestor system of claim 1, wherein at least some of the plurality of baffles comprise angled projections.

10. The tissue digestor system of claim 1, wherein the interior vessel comprises a shaft coupled axially therethrough.

11. The tissue digestor system of claim 1, wherein at least some of the plurality of baffles are coupled to an interior surface of the interior vessel.

12. The tissue digestor system of claim 11, wherein the at least some of the plurality of baffles extend perpendicularly from the interior surface of the interior vessel.

13. The tissue digestor system of claim 10, wherein at least some of the plurality of baffles are coupled to the shaft.

14. The tissue digestor system of claim 13, wherein the at least some of the plurality of baffles extend radially from the shaft.

15. The tissue digestor system of claim 1, wherein the motor is configured to create rotational movement in different spin directions.

16. A method of simultaneously digesting tissue remains in one or more alkaline hydrolysis (AH) bags in a tissue digestor system, comprising
providing the tissue digestor system, having an exterior vessel for holding digestor fluid and an interior vessel configured to rotate within the exterior vessel;
containing the tissue remains within the one or more AH bags, the one or more AH bags constructed to retain therein at least some undigested tissue remains;
inserting the one or more AH bags containing the tissue remains in the interior vessel of the tissue digestor system; and
commencing a digestion cycle to digest the tissue remains in the one or more AH bags with the digestor fluid.

17. The method of claim 16, wherein containing the tissue remains within the one or more AH bags comprises:
providing at least two AH bags;
containing a carcass in each of the at least two AH bags;
wherein multiple carcasses are contained within the interior vessel of the tissue digestor system.

18. The method of claim 16, further comprising forming the one or more AH bags from non-digestible co-polymer material having a plurality of fluid apertures therethrough.

19. The method of claim 18, further comprising using a flexible non-digestible co-polymer material which is resistant to the digestor fluid to form the one or more AH bags.

20. The method of claim 16, further comprising:
providing one or more resealable attachments on each of the one or more AH bags, wherein the one or more resealable attachments are configured to allow opening and closing of the one or more AH bags; and
reusing the one or more AH bags.

21. The method of claim 16, further comprising positioning one or more tumbling blocks within the one or more AH bags.

22. The method of claim 16, further comprising affixing a plurality of baffles to an interior surface of the interior vessel, the plurality of baffles extending inwardly such that the one or more AH bags engage therewith in use.

23. The method of claim 16, wherein commencing the digestion cycle comprises controlling any one or more of temperature, application of digestor fluid, motor speed, and motor direction.

24. The method of claim 16, further comprising disposing of digested soft tissue remains in used digestor fluid.

25. The method of claim 16, further comprising:
removing the one or more AH bags from the interior vessel once the tissue remains are sufficiently digested; and
disposing of or otherwise processing the at least some undigested tissue remains retained in the one or more AH bags.

26. A tissue digestor system for simultaneously digesting tissue remains in one or more alkaline hydrolysis (AH) bags, comprising
an exterior vessel for holding digestor fluid;
a lid attached to the exterior vessel, providing access thereto;
an interior vessel configured to rotate within the exterior vessel;
a lid attached to the interior vessel to provide access thereto;
one or more AH bags disposed within the interior vessel and configured to receive tissue remains therein, the one or more AH bags constructed to retain therein at least some undigested tissue remains; and
a motor configured to provide rotational movement to the interior vessel, thereby tumbling the one or more AH bags within the interior vessel in use to aid digestion of the tissue remains contained therein.

27. The tissue digestor system of 26, wherein the interior vessel comprises a plurality of baffles extending from an interior surface of the interior vessel and wherein rotation of the interior vessel causes the one or more AH bags to impact the plurality of baffles to enhance agitation, abrasion and/or breakdown of the tissue remains in the one or more AH bags.

28. The tissue digestor system of claim 26, wherein the one or more AH bags comprises two or more AH bags, each AH bag being configured to retain a carcass therein, wherein the interior vessel is configured to retain multiple carcasses therein.

29. The tissue digestor system of claim 26, wherein the one or more AH bags comprise non-digestible co-polymer material having a plurality of fluid apertures therethrough.

30. The tissue digestor system of claim 29, wherein the non-digestible co-polymer material is flexible and resistant to the digestor fluid.

31. The tissue digestor system of claim 26, wherein the one or more AH bags are reusable and wherein the one of more AH bags include one or more resealable attachments configured to allow opening and closing of the one or more AH bags between uses.

32. The tissue digestor system of claim 26, further comprising one or more tumbling blocks positionable within the one or more AH bags in use to aid in separation and exposure of the tissue remains.

33. The tissue digestor system of claim 26, further comprising any one or more of a heating element, a heat exchanger system, and a temperature control.

34. The tissue digestor system of claim 26, further comprising a movement control configured to control speed, direction, and rotation of the interior vessel.

35. The tissue digestor system of claim 26, further comprising fluid flow controls.

\* \* \* \* \*